United States Patent [19]

Huttlin

[11] Patent Number: 4,463,703

[45] Date of Patent: Aug. 7, 1984

[54] DRAGEE-MAKING DRUM

[76] Inventor: Herbert Huttlin, Lörracher Strasse 14, D-7853 Steinen, Fed. Rep. of Germany

[21] Appl. No.: 398,082

[22] Filed: Jul. 14, 1982

[30] Foreign Application Priority Data

Jul. 30, 1981 [DE] Fed. Rep. of Germany ....... 3130166

[51] Int. Cl.³ .............................................. B05C 5/00
[52] U.S. Cl. ........................................ 118/19; 118/24
[58] Field of Search .......................... 118/19, 418, 24; 427/242; 34/108; 366/220; 51/164.1

[56] References Cited

U.S. PATENT DOCUMENTS 550,999   12/1895   Otten et al. ........................... 34/108
2,807,230  9/1957   Brammar ............................... 118/19
3,874,092  4/1975   Huttlin ............................. 118/19 X

FOREIGN PATENT DOCUMENTS 2315882   2/1975   Fed. Rep. of Germany .

Primary Examiner—John P. McIntosh
Attorney, Agent, or Firm—Brumbaugh, Graves, Donohue & Raymond

[57] ABSTRACT

A dragee-making drum, whose axis of rotation is at least approximately horizontal, has an at least approximately cylindrical shell and two at least approximately frustum-shaped end wall portions adjoining either end of the shell. These end wall portions extend into the space enclosed by the shell and terminate in annular zones whose axial distance from one another is considerably smaller than the axial length of the shell. It is thereby achieved that the dragee-making material is spread between the frustum-shaped end wall portions. This gives rise to frictional forces which, in addition to the frictional forces that are caused by gravity and are the only forces having effect in known dragee-making drums, tend to entrain the dragee-making material in an upward direction as the drum rotates. Consequently, at a given speed of rotation of the dragee-making drum, the dragee-making material ascends further and above all more uniform, in order to then finally spill down again.

10 Claims, 4 Drawing Figures

DRAGEE-MAKING DRUM

BACKGROUND

The invention relates to a dragee-making apparatus which includes a rotating drum having an axis of rotation which is at least approximately horizontal.

In dragee-making drums, the dragee-making material such as granules, pellets, tablets or seeds is given one or more coatings by a liquid coating compound. The compound is sprayed onto or into the dragee-making material while the material is maintained in motion by the rotating dragee-making drum. The aim in so doing is for coatings of uniform nature, above all uniform thickness and density, to be formed on all the particles of the dragee-making material. These properties are of significance in, for example, such orally administrable medicaments as have to be resistant against gastric juices so as to release their active substances not before reaching the intestines.

The probability of uniform coatings being formed on all the particles of the dragee-making material is maximized if and when the separate particles roll over one another in regular succession as the dragee-making drum rotates. It hence has to be ensured that the separate particles of the dragee-making material are entrained substantially uniformly a certain distance upwards by the rotating drum and are then released to spill back down again.

Dragee-making drums of the kind described at the outset are known, for instance, from U.S. Pat. No. 3,874,092, in which a cylindrical shell is adjoined at either end by an end wall portion tapering frustum-shaped axially towards the outside. In such dragee-making drums, the dragee-making material is generally set into motion with sufficient force, yet in a way not damaging it too much, only if the inner surface of the shell is formed with baffle plates preventing the dragee-making material from sliding down the inner surface of the shell, even when the dragee-making drum is rotating at moderate speed. However, such baffle plates can be a considerable hindrance in cleaning the dragee-making drum, especially if they are of a varied shape or arrangement for promoting the thorough mixture of the dragee-making material.

The equivalent also applies to spherical or bulbiform dragee-making drums, as are likewise known from U.S. Pat. No. 3,874,092.

SUMMARY OF THE INVENTION

The present invention is a dragee-making drum which is capable of imparting a regular rolling or spilling motion to the entire dragee-making material it contains, but which does not require conventional baffle plate arrangements. The cylinder of a dragee-making drum in accordance with the invention may contain baffle plates which are of weakly defined contour and easy to clean, but need not, and preferably does not, contain any baffle plates at all.

According to the invention, a dragee-making drum, having a substantially horizontal axis of rotation, includes a substantially cylindrical shell and a pair of frustum-shaped end wall portions which extend into the space enclosed by the shell.

It is thereby achieved that the dragee-making material is spread between the frustum-shaped end wall portions. This gives rise to frictional forces which, in addition to the frictional forces that are caused by gravity and are the only forces having effect in known dragee-making drums, tend to entrain the dragee-making material in an upward direction as the drum rotates. Consequently, at a given speed of rotation of the dragee-making drum, the dragee-making material ascends further, and above all more uniformly, in order to then finally spill down again. The dragee-making material partly spills down over the ascending dragee-making material, as in known dragee-making drums, and partly over and away from the inwardly projecting frustum-shaped end wall portions according to the invention. The fact that part of the dragee-making material constantly spills over and away from the inwardly projecting end wall portions additionally has a mixing effect, which likewise contributes to all the particles of the dragee-making material being given a particularly uniform coating. Since one can dispense with any baffle plates, the danger of the coatings being damaged can be kept especially slight.

The dragee-making drum according to the invention has the further advantage that, in comparison to known dragee-making drums having equal shell diameter and equal axial overall length, it can accommodate a larger amount of dragee-making material and uniformly process the same in the described manner.

In a preferred embodiment of the dragee-making drum according to the invention, the two frustum-shaped end wall portions terminate in annular zones, whose axial distance from one another is 30% to 70%, preferably 45% to 55%, of the axial length of the shell. The dragee-making drum interior enclosed by the shell is hence given a considerable constriction through the inwardly drawn, frustum-shaped end wall portions according to the invention.

The diameter of the annular zones is suitably in a range of about 30% to 70%, preferably 45% to 55%, of the diameter of the shell.

The two end wall portions, which define portions of inwardly extending cones, have cone angles (measured between two generating lines lying diametrically opposite one another in a common axial plane) of suitably 60° to 120°, preferably 80° to 100°.

The annular zones can each be adjoined by a second end portion tapering frustum-shaped axially towards the outside. Such second end portions facilitate in a known manner the charging of the dragee-making material and prevent particles of an unevenly charged batch from escaping as the dragee-making drum is set into motion. However, in view of the way the dragee-making drum according to the invention normally operates, such end portions are not necessary because even when the batch of dragee-making material is a large one it hardly ever happens that a particle of the dragee-making material rebounds off one of the annular zones in such a way that it could jump out.

BRIEF DESCRIPTION OF THE DRAWINGS

Embodiments of the invention are described below with the help of schematic drawings in which.

DETAILED DESCRIPTION OF THE PREFERRED EMBODIMENTS

Figure 1:
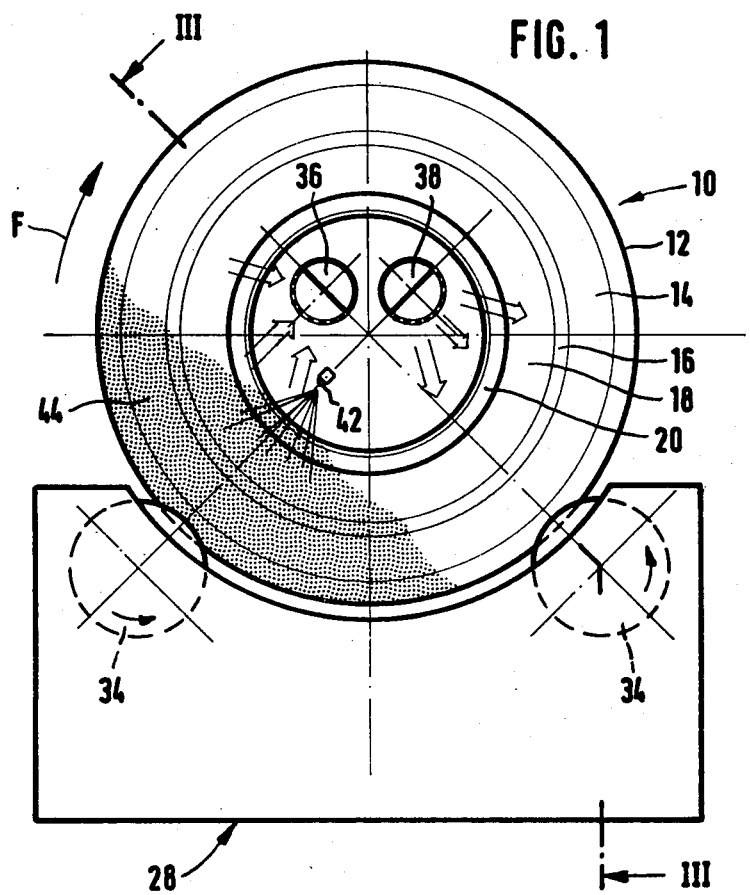
FIG. 1 is a front view of a dragee-making apparatus with a dragee-making drum according to the invention.
Figure 2:
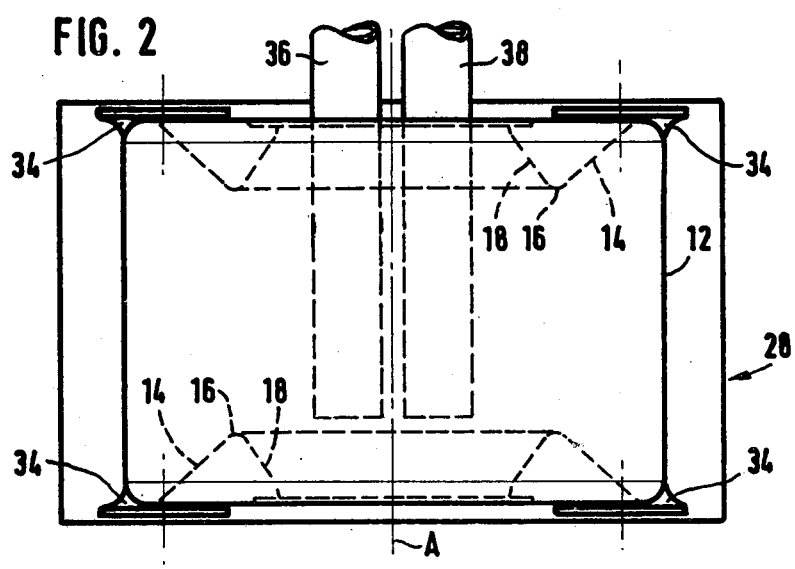
FIG. 2 is the accompanying plan view.
Figure 3:
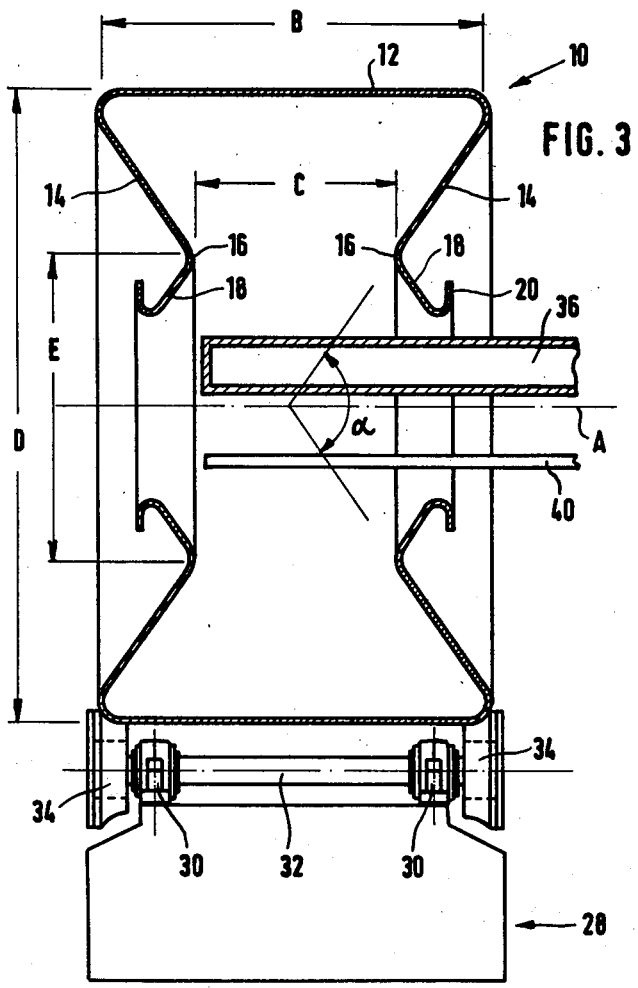
FIG. 3 is a section taken along the line III—III of FIG. 1.

The dragee-making drum 10 illustrated in FIGS. 1 to 3 is rotatable about a horizontal axis of rotation A, has a cylindrical shell 12 of axial length B and two frustum-shaped, ring-like end wall portions 14, each ending in an annular zone 16 coaxial with the axis of rotation A. The two annular zones 16 are spaced apart from one another at an axial distance C which is considerably smaller than the length B of the shell. According to FIG. 3, the distance C is approximately half as large as the length B. The annular zones 16 have a diameter E which, according to FIG. 3, is approximately half as larger as the diameter D of the shell 12. The cone angle $\alpha$ of the end wall portions 14 is about 100° according to FIG. 3.

The two annular zones 16 are each adjoined by a second end portion 18 which tapers frustum-shaped axially towards the outside and ends with a flange 20.

Figure 4:
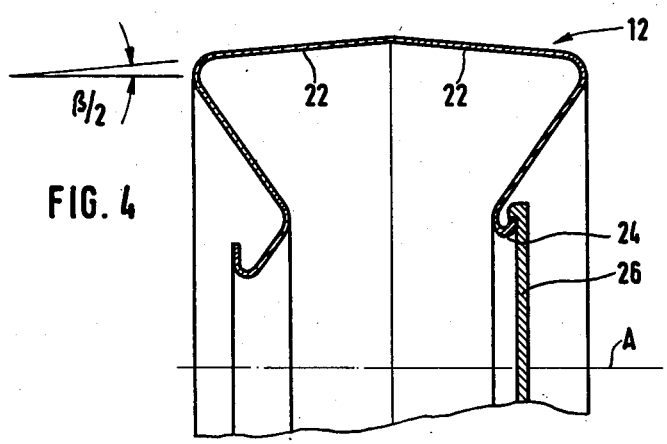
FIG. 4 is a modified embodiment in a partial section corresponding to FIG. 3.

The foregoing also applies in the main to the embodiment illustrated in FIG. 4. There, however, the shell 12 is only approximately cylindrical because it is composed of two shell parts 22 tapering slightly frustum-shaped in a direction away from one another with a cone angle $\beta$. Furthermore, instead of one of the two end portions 18 with associated flange 20, as are shown in FIG. 3, there is provided in FIG. 4 a simple beaded edge 24. The latter directly adjoins the adjacent annular zone 16 and defines an opening which is correspondingly larger than the openings enclosed by the flanges 20 shown in FIG. 3 and in the left hand half of FIG. 4. The opening on the right in FIG. 4 is covered by a cap 26 which is held fast in a known manner by mechanical fastening means and/or sub-atmospheric pressure prevailing in the interior of the dragee-making drum 10.

According to FIGS. 1 to 3, the dragee-making drum 10 is mounted on a roller block 28 having bearings 30 arranged in pairs, which support shafts 32 at whose ends rollers 34 are attached. One of the shafts 32 is connected in the usual way to a geared motor disposed within the roller block 28.

The rollers 34 are devised such that they not only support the dragee-making drum 10 in a radial direction but also guide it in an axial direction. This does not necessitate that the shell 12 is enclosed in the usual way by ring-like rails, because the frustum-shaped, inwardly-drawn end wall portions 14 reinforce the shell 12 at its two edges such that they can directly take up the supporting forces transferred by the rollers 34. According to FIGS. 1 to 3, an air supply pipe 36, an air exhaust pipe 38 and a pipe 40 for spray medium extend parallel to the axis of rotation A into the dragee-making drum 10. Air supply pipe 36 and air exhaust pipe 38 are perforated in the region between the planes of the two annular zones 16. In this region the pipe 40 for spray medium is provided with nozzles 42 through which a spray medium, e.g. a sugar solution or a lacquer, can be sprayed onto or into a dragee-making material 44 contained in the dragee-making drum 10, while the latter rotates in the direction of arrow F in FIG. 1.

The foregoing are representative of the preferred embodiments of the invention. Variations and modifications of the preferred embodiments will be apparent to persons skilled in the art without departing from the inventive concepts disclosed herein. All such modifications and variations are intended to be within the scope of the invention as defined in the following claims.

I claim:

1. Dragee-making apparatus comprising a drum rotatable about an axis at least approximately horizontal, said drum including a substantially cylindrical shell portion and a pair of axially spaced, frustum shaped end wall portions adjoining opposite ends of said shell portion, wherein said shell portion defines a space and said frustum shape portions extend into said space, thereby being adapted to entrain material contained within said drum during rotation, and further comprising means for spraying a liquid into said drum.

2. Dragee-making apparatus as defined in claim 1, wherein the two frustum-shaped end wall portions terminate in annular zones, the axial spacing between said zones being approximately 30% to 70% of the axial length of said shell portion.

3. Dragee-making apparatus as defined in claim 2, wherein the two frustum-shaped end wall portions terminate in annular zones, the axial spacing between said zones being approximately 45% to 55% of the axial length of said shell portion.

4. Dragee-making apparatus as defined in claim 2 or 3, wherein the diameter of said annular zones is approximately 30% to 70% of the diameter of said shell portion.

5. Dragee-making apparatus as defined in claim 4, wherein the diameter of said annular zones is approximately 45% to 55% of the diameter of said shell portion.

6. Dragee-making apparatus as defined in claim 2, wherein said drum comprises a pair of second end portions, one adjoining each annular zone of said frustum shaped portions, wherein said second end portions are frustum shaped to taper in directions axially apart.

7. Dragee-making apparatus as defined in claim 1, wherein each frustum shaped end portion, defining a portion of a cone, has a cone angle in the range of approximately 60° to 120°.

8. Dragee-making apparatus as defined in claim 7, wherein said range is approximately 80° to 100°.

9. Dragee-making apparatus as defined in claim 1, wherein said cylindrical shell portion has a smooth interior surface.

10. Dragee-making apparatus comprising a drum rotatable about an axis at least approximately horizontal, said drum including a substantially cylindrical shell portion and a pair of axially spaced, frustum shaped end wall portion immediately adjoining opposite ends of said cylindrical shell portion, wherein said shell portion defines a space and said frustum shaped portions extend into said space, thereby being adapted to entrain material contained within said drum during rotation.

* * * * *